United States Patent [19]

Chan

[11] Patent Number: 4,736,411
[45] Date of Patent: Apr. 5, 1988

[54] TELEPHONE INSTRUMENT

[76] Inventor: Eric Chan, 506 E. 82nd St., No. 13, New York, N.Y. 10028

[21] Appl. No.: 945,893

[22] Filed: Dec. 24, 1986

[51] Int. Cl.$^4$ .............................................. H04M 1/02
[52] U.S. Cl. ................................... 379/368; 379/428; 379/434; 379/436
[58] Field of Search ............... 379/368, 424, 428, 433, 379/434, 436, 437; D14/53, 60, 62, 63, 64

[56] References Cited

U.S. PATENT DOCUMENTS

| D. 265,401 | 7/1982 | Genoro et al. | D14/64 X |
| D. 277,378 | 1/1985 | Cooke et al. | D14/64 X |
| D. 281,687 | 12/1985 | Sakow | D14/60 X |
| D. 282,739 | 2/1986 | Salovaara | D14/63 X |
| 2,623,128 | 12/1952 | Myles | 379/436 X |
| 3,521,008 | 7/1970 | Tyson | D14/60 X |
| 4,436,965 | 3/1984 | Morse | 379/368 X |
| 4,446,333 | 5/1984 | Kessler | 379/99 X |

FOREIGN PATENT DOCUMENTS

| 1409283 | 7/1965 | France | 379/434 |
| 0233901 | 3/1986 | German Democratic Rep. | 379/424 |

OTHER PUBLICATIONS

Dracon Industries, "Our New TS-21 Test Set is Even Newer", Telephony, Nov. 20, 1978, p. 21.
"Data-Entry Keyboard is Touch Sensitive", IEEE Spectrum, p. 100A, Jan. 1978.
"PortaCom PC-8110", Data Products, pp. 1-4, 5/69.

Primary Examiner—Jin F. Ng
Assistant Examiner—Matthew E. Connors
Attorney, Agent, or Firm—William E. Pelton

[57] ABSTRACT

A telephone instrument comprising a handset and a base unit in which the base unit is substantially smooth on its upper surface except for a raised area having a spherical surface and a slight recess which respectively cooperate with a correspondingly formed spherically shaped indentation and a small raised semi-cylindrical portion on the handset. In this manner, the base unit provides a substantially smooth upper surface, so as not to provide any area that might retain dirt or grime. In one embodiment, the telephone instrument is formed of thermoplastic rubber and is substantially water-resistant, with all electrical components contained within the handset.

15 Claims, 2 Drawing Sheets

TELEPHONE INSTRUMENT

BACKGROUND OF THE INVENTION

1. Field of the Invention

This invention generally relates to a telephone instrument having a handset and base unit and, more particularly, to a telephone instrument of the kind in which the base unit presents a smooth surface to permit easy cleaning.

2. Description of the Background

Various different constructions for telephone instruments have been proposed over the years, however, even with the advent of modern materials and fabrication techniques, the overall designs of telephones in general still leave room for improvement. One such area of improvement relates to the material from which telephones are made, which have evolved from the original Bakelite to modern Styrene plastics, and one drawback is the susceptibility to breakage with such brittle materials. Moreover, with many new manufacturers of telephone instruments on the scene today, the materials are even less substantial and typically are thin injection-molded plastics, which frequently crack and break during normal usage.

Another problem in conventional telephones relates to their susceptibility to moisture and the like, thus, generally prohibiting outdoor use, unless they are specifically hermetically sealed.

Of the many different constructions for a telephone instrument intended for table top or desk top use, all such instruments provide cradle in the base formed having walls or a depressed receptacle to receive the handset. Exemplary of this construction are design patents U.S. Pat. No. Des. 281,242 and U.S. Pat. No. Des. 257,977. Each of these designs provide a walled receptacle area in the base of the telephone instrument for receiving the handset. It has been found that these recessed receptacle areas attract dirt and grime, and are difficult to keep clean.

OBJECTS AND SUMMARY OF THE INVENTION

Accordingly, it is an object of the present invention to provide a telephone instrument that can eliminate the above-noted defects inherent in the prior art.

Another object of this invention is to provide an improved telephone instrument in which a positive interface means are provided between the base and the handset without the requirement for a recessed cradle.

A further object of the present invention is to provide a telephone instrument formed of rubber-like material, which is resilient and which may be easily constructed to render the telephone handset substantially waterproof.

In accordance with an aspect of the present invention, a telephone receiver is provided in which the base does not include a recessed receptacle for receiving the handset but has only a small indented area at one edge to interface with a corresponding raised microphone portion on the handset and in which the base is provided with a raised area whose surface is a portion of a sphere to interface with a correspondingly shaped spherical depressed area at the ear piece of the handset. The telephone instrument is constructed of a rubberized plastic material that is resilient and substantially moisture proof. The dialing keypad can be arranged in the handset behind a suitable membrane and is, thus, made moisture and dirt proof. In addition to the conventional on/off switch, or "tip" switch, the telephone can also be actuated magnetically by a magnetic switch, the two elements of which are located respectively in the handset and the base. By providing the handset with a special form, it is possible to utilize the handset in the hands-free operational mode more readily than a conventional handset configuration. The angle between the earpiece and mouthpiece is specifically chosen, as described below.

The above and other objects, features, and advantages of the present invention will become apparent from the following detailed description of illustrated embodiments thereof, to be read in conjunction with the accompanying drawings.

DETAILED DESCRIPTION OF PREFERRED EMBODIMENTS

Figure 1:
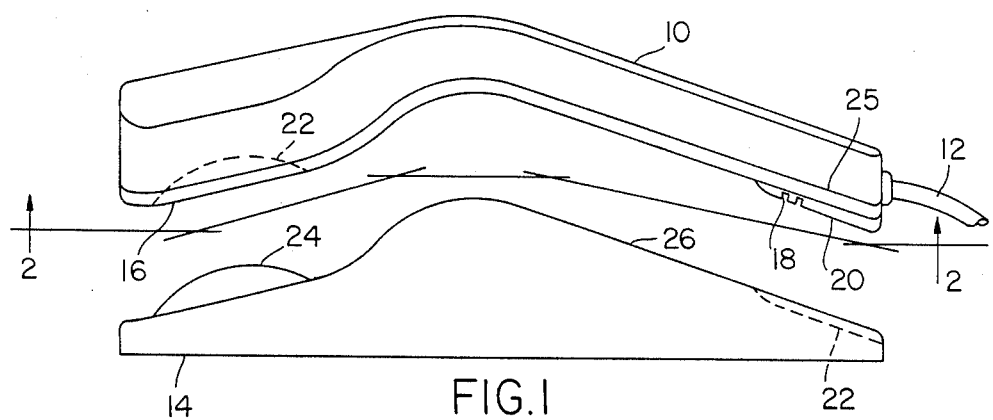
FIG. 1 is a elevational view of the inventive telephone instrument showing the handset in spaced-apart relationship with the base.

Turning now to the drawings, FIG. 1 shows an embodiment of the present invention in which the handset is conformed to substantially the same outline as the base unit, and in which at least some of the electrical apparatus is arranged within the handset itself, as well as in the base. More specifically, the handset unit 10 is connected to the commercially available telephone network by way of telephone cable 12. Thus, base unit 14 is not only formed having no upper receptacle, that is, having a substantially smooth top surface, but in this embodiment also has no electrical telephone connections made thereto. In another embodiment, the base 14 could be connected to the telephone network and also to handset 10, as in conventional telephone instruments. Handset unit 10 includes an earpiece area 16 that houses a transducer or loudspeaker to be arranged proximate the user's ear and includes a microphone (not shown in FIG. 1) located behind two slots 18 which are formed in a raised area 20 that has a cylindrical surface. Earpiece area 16 is a round depression having a spherical surface, as represented by dashed lines 22, and this depression cooperates with a correspondingly shaped round, raised area 24 that consists of a spherical surface formed in base unit 14. Similarly, the short raised area 20 having a cylindrical surface will fit into a correspondingly shaped depression 22 having a cylindrical surface formed in base unit 14. With the exception of recess 22 and raised portion 24, base unit 14 is totally smooth on its upper-most surface 26. This will be seen more clearly in FIG. 6.

It is a feature of the present invention that both handset unit 10 and base unit 14 are constructed of a rubberoid material, such as a thermoplastic rubber known as Santoprene available from the Monsanto Company. Of course, other similar thermoplastic rubber compounds are suitable for use, without departing form the spirit of the present invention. Alternatively, the handset could be formed of a rigid plastic with a skin of rubber or rubberoid material. In another embodiment the handset could have a back element formed of rigid plastic with a front face or surface formed of the rubberoid material. A seam 25 in FIG. 1 represents where such plastic back and rubberoid face might be joined.

Figure 2:
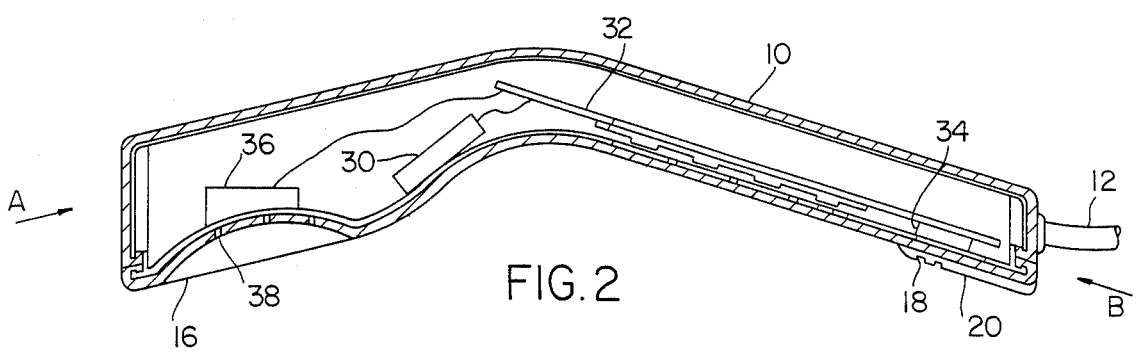
FIG. 2 is a cross-sectional view of the handset of FIG. 1 taken through section lines 2—2.

By providing upper surface 26 of base unit 14 with a continuously smooth surface with no walled cradle of the kind intended to receive the entire lower portion of the handset, the problem is presented concerning the arrangement of the tip switch. As seen in FIG. 2, which is a cross-sectional view taken along section lines 2—2 in the embodiment of FIG. 1, a magnetically operated reed switch 30 is provided in handset 10 that cooperates with a permanent magnet (not shown) suitably positioned inside base unit 14. Thus, as soon as handset unit 10 is displaced from its at-rest position on base unit 14, as represented in FIG. 1, for example, tip switch 30 is operated and handset unit 10 is connected to the telephone network. Also located in handset unit 10 are the appropriate electronics, arranged, for example, on a printed circuit board 32 which also can include the contact switches that comprise the keypad to permit dialing of the telephone. A suitable, high-sensitivity microphone 34 is arranged behind slits 18 in the cylindrically shaped upraised portion 20. Similarly, a loudspeaker or audio transducer 36 is located in earpiece area 16 of handset unit 10. Perforations 38 may be formed at earpiece area 16 to permit the sound produced by transducer 36 to be transmitted. Audio transducers such as 36 employed herein that are waterproof are commercially available and in the embodiment of the invention in which handset unit 10 is to be waterproof, such hermetically sealed audio transducer unit would be employed.

Figure 3:
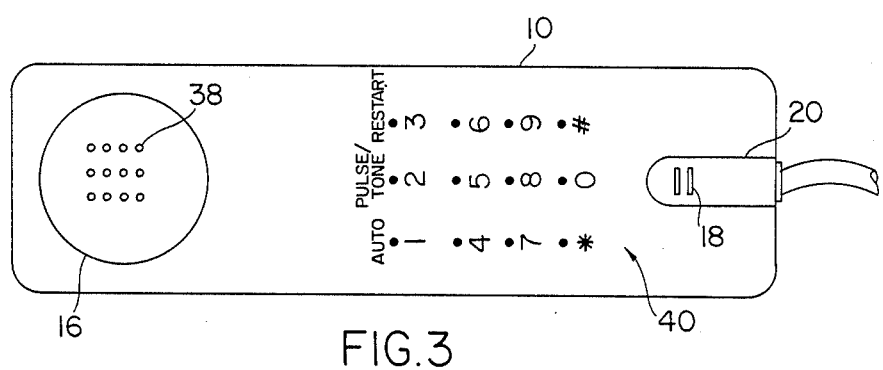
FIG. 3 is a plan view of the operational side of the handset of FIG. 1.

Turning to FIG. 3, the specific arrangement of the keypad 40 is shown and in which the conventional twelve buttons in a standard telephone keypad, as well as other function keys, are provided. The other function keys can include automatic redial, a pulse/tone switch, and a disconnect button, so that sequential calls may be made without repeatedly hanging up the handset. While these buttons may be the standard, manually actuated push buttons that undergo some linear excursion when depressed, preferably such switches (not shown) are the kind in which a membrane is arranged over the switches formed on circuit board 32 of FIG. 2, so that switches are hermetically sealed and are actuated by finger pressure at the appropriate locations on the membrane. Thus, a rubber layer may cover a plurality of microswitches in the handset, which are actuated by deforming the rubber cover by manual pressure. Alternatively, the switches can be membrane switches of the known kind, such as found on microwave ovens, for example. It should be noted in FIG. 3 that earpiece area 16 is a spherically shaped depression, whereas microphone area 20 is a raised cylindrical surface having a rounded end proximate microphone slits 18.

Figure 4:
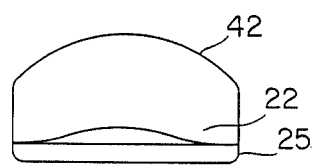
FIG. 4 is a front elevational view of the handset.
Figure 5:
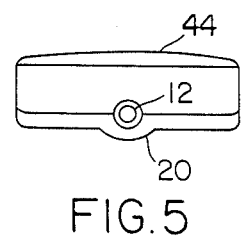
FIG. 5 is a rear elevational view of the handset.

By providing the special arcuately shaped profile for handset 10, as shown in FIGS. 1 and 2, the handset lends itself to hands-free operation by the user and, in that regard, attention is directed to FIG. 4, which is an elevational view, looking generally along arrow A in FIG. 2, of the earpiece end 42 of handset 10. FIG. 4 shows that at location 42 a substantial thickness is provided to the earpiece, as compared with the thickness of the microphone end 44 as seen in FIG. 5. FIG. 5 is an elevational view looking generally along arrow B in FIG. 2. Thus, this thickened portion and the angle and distance between the earpiece and microphone provide an improved capability for holding the handset between the shoulder and ear of the user, thereby permitting hands-free operation. In this embodiment, the angle between the plane of the earpiece and the plane of the keypad is approximately 148.5°.

Figures 6, 7:
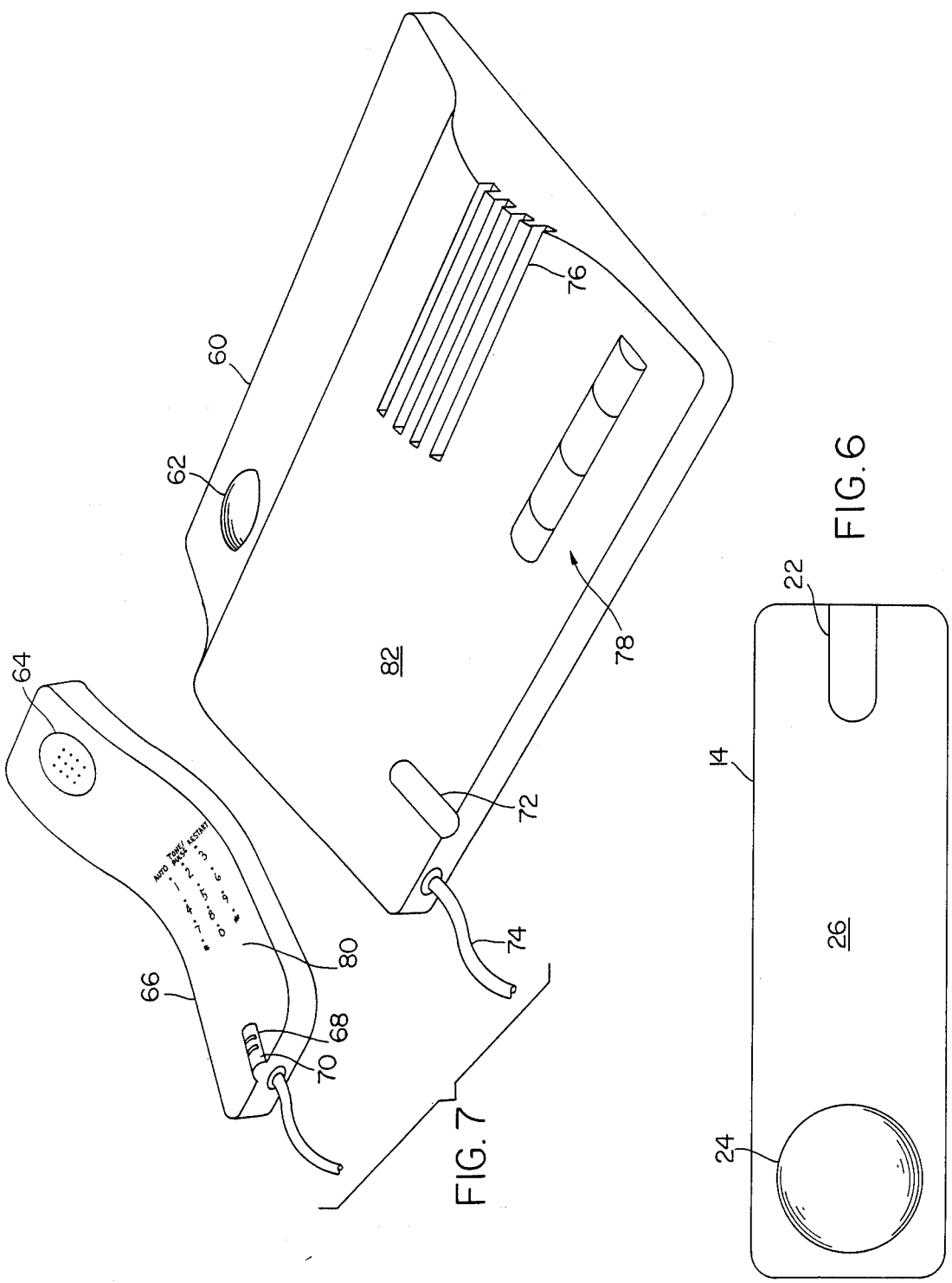
FIG. 6 is a top plan view of the base of FIG. 1.
FIG. 7 is a perspective view of another embodiment of the present invention.

As pointed out above, a principal feature of the present invention relates to the smooth upper surface 26 of base unit 14, and this feature is shown more clearly in FIG. 6, which is a top plan view of base unit 14. More particularly, upraised portion 24 is seen as being round with a spherical surface, and upper surface 26 is void of any depressions or ornamentation, save the small indentation 22 into which the cylindrical raised area 20 on the handset fits. Therefore, no dirt or dust collection areas are provided on base 14 with the minor exception of the small indentation 22 formed therein, which is easily wiped free of dirt. Note also that raised area 20 is sized for a close fit in indentation 22, so that no dirt can enter when the telephone instrument is not in use. Preferably, base unit 14 is also formed of the same thermoplastic rubber material as handset unit 10.

Turning to a second embodiment of the invention, a desk unit is shown in FIG. 7. This embodiment provides a base unit 60 of substantially larger size than the other embodiment and, therefore, in this embodiment the electronics for the telephone may alternately be contained within base unit 60. Nevertheless, the feature of the present invention relating to a substantially cradle free base unit carries over in this embodiment in that a raised spherical surface area 62 is provided to cooperate with a correspondingly shaped spherically depressed area 64 formed at the earpiece area of the handset unit 66. Also, the microphone of handset unit 66 is provided behind two slits 68 which are formed in a small raised area 70 with a cylindrical surface, which then mates with a correspondingly shaped indentation 72 formed in base unit 60. Handset unit 66 and base unit 60 are interconnected by a suitable expandable telephone cord 74. A further feature of this embodiment is that by providing a relatively larger base, the unit may be used as a speaker phone in a conventional fashion by use of a loud speaker or similar audio transducer located behind a number of grill slits, shown generally at 76. Similarly, multiple line capability or other features involving recording phone calls and the like can be provided and can be controlled by means of the control buttons, shown generally at 78. In addition, it is also contemplated to include in the base unit 60 a visual display for the time and the like and also a multiple line telephone switching system, as well as a voice/data modem junction. In the embodiment of FIG. 7, handset unit 66 can be made in a somewhat different configuration, that is, have the same height profile at each end, thus, each end of the hand unit 66 would approximately appear as shown in FIG. 5. Alternately, it can be identical to the embodiment of FIG. 1. In addition, a keypad may be provided at area 80 on the handset or the keypad and display unit could be placed on the smooth main surface 82 of base unit 60.

The above description is provided for preferred embodiments of the invention, however, it will be apparent that many modifications and variations could be effected by one skilled in the art without departing from the spirit or scope of the novel concepts of the invention, which should be determined only by the appended claims.

What is claimed is:

1. A telephone instrument, comprising:

a handset unit elongated along a curved longitudinal axis extending from an earpiece end to a microphone end and having an earpiece and a microphone in spaced-apart relationship, said earpiece being mounted near said earpiece end and including a concave portion having a spherical surface and said microphone being mounted near said microphone end in a semicylindrical raised portion having an axis substantially parallel to said longitudinal axis, said concave portion forming a first locating recess and said raised portion forming a first locating element; and a base unit for receiving said handset unit and being formed with a convex area with a spherical surface forming a second locating element cooperating with said first locating recess formed in said handset unit and having a semicylindrical concave portion forming a second locating recess spaced apart from said second locating element by a distance substantially equal to a distance separating said first locating recess and said first locating element on said handset, said second locating recess cooperating with said first locating element, and said base unit being formed with an upper, substantially smooth surface proximate said handset.

2. A telephone instrument according to claim 1, further comprising an electrical cable for directly connecting said handset unit to an existing telephone network.

3. A telephone instrument according to claim 1, further comprising a magnetically operated switch arranged in said handset unit and a permanent magnet arranged in said base unit, whereby said magnetically operated switch is actuated to connect said handset to a telephone network.

4. A telephone instrument according to claim 1, in which said handset unit and said base unit are formed of thermoplastic rubber.

5. A telephone instrument according to claim 1, in which said handset unit and said base unit have a lower surface and an upper surface, respectively, that are complementally shaped, whereby said handset unit can be placed upon said base unit with substantially all of said lower surface in contact with substantially all of said upper surface.

6. A telephone instrument according to claim 1, wherein said first locating element is smaller than said first locating recess.

7. A telephone instrument according to claim 1, wherein said handset unit is formed with a cross section in a plane perpendicular to said curved longitudinal axis which is greater at said earpiece end than at said microphone end.

8. A telephone instrument according to claim 1, in which said handset unit is accurately contoured between said earpiece and microphone and in which said base unit is correspondingly arcuately contoured between said second locating element and said second locating recess, whereby residence of said handset unit on said base unit is facilitated.

9. A telephone instrument according to claim 1, in which said handset unit further comprises a keypad and a thin membrane covering said keypad for performing a dialing operation.

10. A telephone instrument for use with a telephone network comprising;

a base unit elongated from one end to an opposite end, formed with a substantially smooth, unbroken upper surface, having at said one end a rounded, smooth, upraised portion and at said opposite end a concave slot, and having between said one end and said opposite end a smooth, upraised arcuate portion, said base unit being electrically isolated from said telephone network; and a handset unit selectively electrically connected to said telephone network, said handset unit being elongated along a curved longitudinal axis extending from an earpiece end to a microphone end and having at said earpiece end an earpiece formed as a rounded, smooth concave portion cooperating with said upraised portion in a handset-base unit at-rest position and at said microphone end a microphone formed as a rounded, upraised rib element cooperating with said concave slot in said at-rest position, a surface of said handset unit being arcuately contoured between said earpiece end and said microphone end.

11. A telephone instrument according to claim 10, further comprising a magnetically operated switch arranged in said handset unit and a permanent magnet arranged in said base unit, whereby said magnetically operated switch is actuated to selectively connect said handset to said telephone network.

12. A telephone instrument according to claim 10, in which said handset unit and said base unit are formed of thermoplastic rubber.

13. A telephone instrument according to claim 10, in which said handset unit and said base unit have a lower surface and an upper surface, respectively, that are complementally shaped, whereby said handset unit can be placed upon said base unit with substantially all of said lower surface in contact with substantially all of said upper surface.

14. A telephone instrument according to claim 10, wherein said handset is formed with a cross section in a plane perpendicular to said curved longitudinal axis which is greater at said earpiece end than at said microphone end.

15. A telephone instrument according to claim 10, in which said handset unit further comprises a keypad and a thin membrane covering said keypad for performing a dialing operation.

* * * * *